(12) United States Patent
Carlson

(10) Patent No.: US 9,910,343 B2
(45) Date of Patent: Mar. 6, 2018

(54) MODERATION OF A DRIVER ASSIST CAMERA ENVIRONMENT BY COOLING FAN

(71) Applicant: TRW AUTOMOTIVE US LLC, Livonia, MI (US)

(72) Inventor: Daniel D. Carlson, Livonia, MI (US)

( * ) Notice: Subject to any disclaimer, the term of this patent is extended or adjusted under 35 U.S.C. 154(b) by 0 days.

(21) Appl. No.: 15/312,679

(22) PCT Filed: Jun. 9, 2015

(86) PCT No.: PCT/US2015/034858
§ 371 (c)(1),
(2) Date: Nov. 21, 2016

(87) PCT Pub. No.: WO2015/191550
PCT Pub. Date: Dec. 17, 2015

(65) Prior Publication Data
US 2017/0184945 A1    Jun. 29, 2017

Related U.S. Application Data

(60) Provisional application No. 62/010,703, filed on Jun. 11, 2014.

(51) Int. Cl.
*G03B 17/55* (2006.01)
*G03B 17/02* (2006.01)
*B60R 11/04* (2006.01)
*H04N 5/225* (2006.01)
*B60R 11/00* (2006.01)

(52) U.S. Cl.
CPC ............. *G03B 17/55* (2013.01); *B60R 11/04* (2013.01); *G03B 17/02* (2013.01); *H04N 5/2252* (2013.01); *B60R 2011/0026* (2013.01)

(58) Field of Classification Search
CPC ...................................................... G03B 17/55
See application file for complete search history.

(56) References Cited

U.S. PATENT DOCUMENTS

| 4,984,089 A * | 1/1991 | Stiepel ............... G03B 17/08 165/48.1 |
| 7,612,799 B1 | 11/2009 | Frank et al. |
| 2003/0169522 A1 * | 9/2003 | Schofield ............ B60R 1/04 359/876 |
| 2005/0213960 A1 * | 9/2005 | Baldwin ............. G03B 29/00 396/439 |

(Continued)

FOREIGN PATENT DOCUMENTS

| CN | 202798945 | 3/2013 |
| WO | 2014026508 | 2/2014 |

OTHER PUBLICATIONS

PCT/US2015/034858 International Search Report and Written Opinion, dated Aug. 19, 2015.

*Primary Examiner* — W B Perkey
(74) *Attorney, Agent, or Firm* — Tarolli, Sundheim, Covell & Tummino LLP

(57) ABSTRACT

A system for moderating the environment surrounding a driver assist camera of a vehicle having a camera mounted within a housing, the housing adapted to be attached to a window of the vehicle. A fan is connected to the housing to force airflow through the housing to moderate the environment surrounding the camera.

10 Claims, 3 Drawing Sheets

(56) References Cited

U.S. PATENT DOCUMENTS

| | | | |
|---|---|---|---|
| 2009/0315992 A1* | 12/2009 | Haug | B60R 11/0241 |
| | | | 348/148 |
| 2012/0207461 A1* | 8/2012 | Okuda | B60R 11/04 |
| | | | 396/419 |
| 2013/0222683 A1 | 8/2013 | Alm et al. | |
| 2014/0036079 A1 | 2/2014 | Lang et al. | |
| 2014/0049648 A1 | 2/2014 | Stein et al. | |
| 2014/0055608 A1* | 2/2014 | Martin | G08B 13/19606 |
| | | | 348/143 |
| 2016/0119509 A1* | 4/2016 | Wato | H04N 5/2251 |
| | | | 348/148 |

\* cited by examiner

MODERATION OF A DRIVER ASSIST CAMERA ENVIRONMENT BY COOLING FAN

CROSS REFERENCES TO RELATED APPLICATION

This patent application hereby claims priority to U.S. Provisional Patent Application Ser. No. 62/010,703 filed Jun. 11, 2014 entitled MODERATION OF A DRIVER ASSIST CAMERA ENVIRONMENT BY COOLING FAN to Daniel D. Carlson. The above-identified application is incorporated herein by reference in its entirety for all purposes.

FIELD OF THE INVENTION

The present invention is directed to a system to moderate the environment surrounding a driver assist ("DAS") camera mounted in a housing by use of a cooling fan.

BACKGROUND

DAS cameras are incorporated in a vehicle platform to provide additional information to intelligent vehicle safety systems to aid the driver. The camera may be mounted near or on the vehicle windshield to ensure a maximum field of view. As a result, the camera may be exposed to direct sunlight for prolonged periods of time resulting in substantial heat build-up. The camera is also subject to extreme cold during winter and variable degrees of humidity.

SUMMARY OF THE INVENTION

A system to moderate the environment surrounding a driver assist ("DAS") camera mounted in a housing by use of a fan to provide forced air directly through the DAS camera housing compartment.

In accordance with an example embodiment of the present invention, a system is provided for moderating the environment surrounding a driver assist camera of a vehicle in which a camera mounted within a housing adapted to be attached to a window. A fan is connected to the housing to force airflow through the housing to moderate the environment within.

DETAILED DESCRIPTION

The present invention provides a system for moderating the environment surrounding a DAS camera mounted within a housing. A fan in close proximity to the camera forces stagnant air to evacuate from a camera trim housing and quickly replaces it with air from the vehicle cabin upon vehicle startup. Conditioned cabin air temperatures are more favorable for operation of the camera than extremely hot or cold air. The forced air from the fan is capable of cooling or warming an upper windscreen mounted camera more quickly than other systems. For example, other systems rely on convective heat transfer from the camera housing without the use of forced air. Such a system would result in delayed cooling that could prevent proper camera system operation or cause damage to the camera. For cameras mounted near the top of the vehicle interior, forced airflow may be further directed past the optical path of the camera lens. This air may be used to defog or defrost the windscreen glass, defog or defrost the lens, or clear dust from the optical path of the camera.

Figure 1:
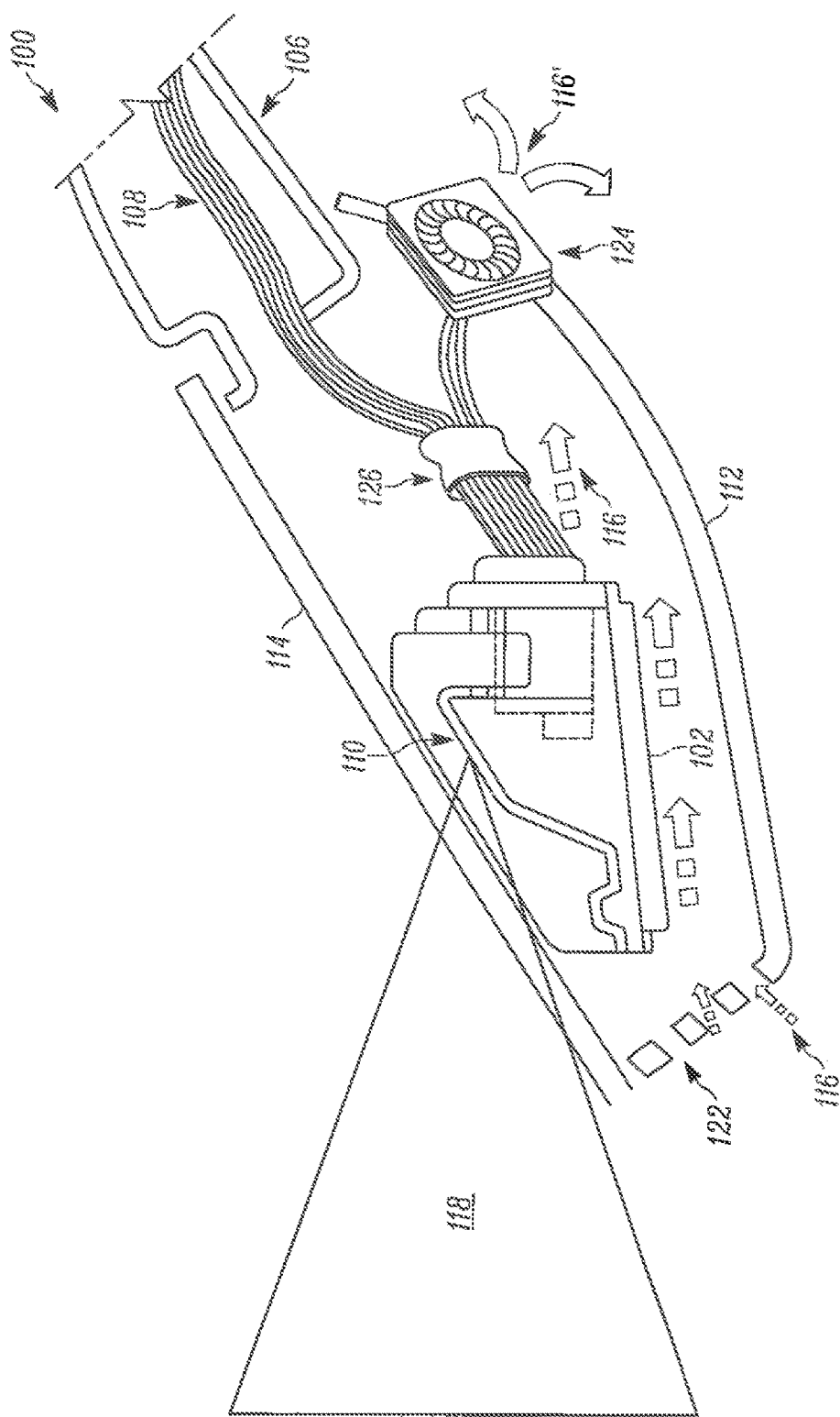
FIG. 1 is a schematic block diagram illustrating a system to moderate the environment surrounding a DAS camera in accordance with an example embodiment of the present invention.

FIG. 1 illustrates a system 100 for moderating the environment of a DAS camera located within a trim housing 112 in accordance with an example embodiment of the present invention. In the example of FIG. 1, the trim housing 112 is attached to the mounting bracket 110. The trim housing 112 encloses a camera housing 102, which contains the DAS camera and is configured to be attached to the vehicle by a mounting bracket 110. The camera housing 102 can be configured to further aid in moderating the temperature of the camera by being composed of a material suitable for heat transfer. For example, the camera housing 102 can be made of a highly heat conductive metal and could include heat sink fins extending into the path of airflow 116, resulting in a heat transfer device.

One or more control wires 108 are connected to the camera housing 102 and secured by one or more wire harnesses 126. In accordance with one example embodiment of the present invention, the control wires 108 can communicate with a vehicle electronic control unit ("ECU") programmed to execute a control process, including one or more commands. Those skilled in the art will appreciate that the control functions of the ECU could be accomplished by using discrete circuitry, a combination of different types of circuitry, or an application specific integrated circuit ("ASIC") and can be embodied in either the analog or digital domain. Controls specific to the DAS camera can include a temperature sensor and a humidity sensor.

The mounting bracket 110 can be, for example, secured to the vehicle by windshield 114 using any suitable method and/or component. For instance, an adhesive, a snap-fit connection, etc., may be used to secure the mounting bracket 110 to the windshield 114. Moreover, the mounting bracket 110 may be attached to the trim housing 112 or may be independently secured to the vehicle.

A fan 124 provides forced airflow 116 into the interior of the trim housing 112. The fan 124 can be located at an endpoint of the trim housing 112 to create negative pressure within the housing 112, forcing air 116 from the vehicle cabin to enter the housing 112 through port 122 and cause exhausted air 116' to exit the housing by the fan 124. Through this process, the fan 124 forces conditioned air 116 from the vehicle cabin past the camera. For example, in response to a low ambient air temperature, heated air can be forced over the camera to defog or defrost the camera lens or inside surface of the windshield. In an environment with elevated ambient temperatures, cooled air can lower the temperature of the DAS camera and associated components to ensure proper operation. The flow of air 116 can additionally be directed to clear the components within the optical path of the field of view 118 of dust and other debris between the camera lens and the windscreen 114.

Operation of the fan 124 can be in response to a control specific to the DAS camera system, such as the temperature and/or humidity sensor reaching a predetermined threshold value. Thus, the fan 124 can activate in order to provide airflow 116 through the housing as described herein. Alternatively, the fan 124 can be connected to one or more controls associated with the vehicle. In one example, upon engaging an ignition switch (e.g., turning on the vehicle), the fan 124 can activate. Additionally or alternatively, the fan 124 can be controlled with the vehicle HVAC system, such that when the HVAC system is engaged, the fan 124 activates in order to force airflow 116 through the trim housing 112.

Although FIG. 1 shows fan 124 located at the end adjacent the headliner of the trim housing 112 pulling airflow 116 into port 122 from the cabin below, the location of the fan 124 and port 122 can be reversed. For example, fan 124 can push airflow 116 into the trim housing 112 and exhaust air 116' through port 122. Alternatively, the direction of the fan 124 air movement can be reversed, such that airflow 116 is introduced into the trim at the location of fan 124, i.e., the fan direction can be reversed.

Figure 2:
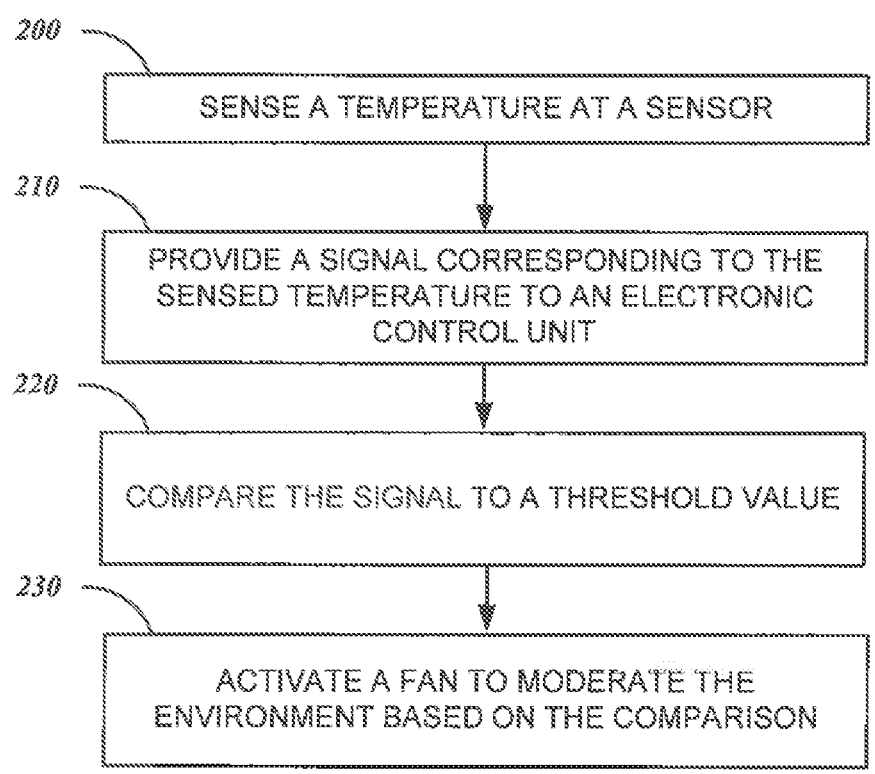
FIG. 2 is an illustration of a method in accordance with an example embodiment of the present invention.

FIG. 2 provides a method of moderating the environment surrounding a driver assist camera of a vehicle by employing the systems described herein. In step 200, a temperature is sensed at a temperature sensor that is located within a housing attached to a window of the vehicle that houses the driver assist camera. In step 210, a signal corresponding to the sensed temperature is provided to an electronic control unit. In step 220, the signal is compared to one or more predetermined threshold values associated with the temperature sensor. For example, a threshold can be set at the high end of the acceptable operating range of temperature for the driver assist camera. Further, a second threshold can be set at a low end of the acceptable operating range. In step 230, a fan connected to the housing can be activated to force airflow through the housing so as to moderate the environment based on the comparison of the sensed value and the threshold values.

Figure 3:
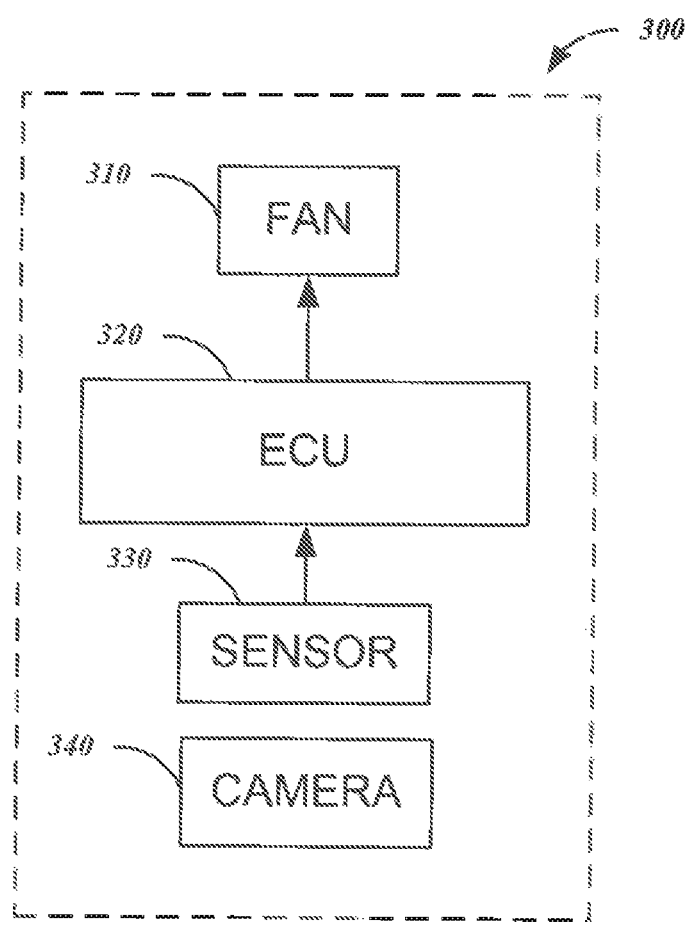
FIG. 3 is a diagram illustrating a system to moderate the temperature of a DAS camera in accordance with an example embodiment of the present invention

FIG. 3 illustrates a system 300 for moderating the environment around a DAS camera 340 located in accordance with an example embodiment of the present invention. In the example of FIG. 3, the system 300 incorporates a sensor 330 in connection with an ECU 320, such as described herein. The ECU 320 processes signals from the senor to control a fan 310 to force airflow into the environment surrounding the camera 340.

From the above description of the invention, those skilled in the art will perceive improvements, changes and modifications. Such improvements, changes and modifications within the skill of the art are intended to be covered by the present invention.

Having described the invention, the following is claimed:

1. A system for moderating the environment of a driver assist camera of a vehicle comprising:
   a camera mounted within a housing, the housing adapted to be attached to a window of the vehicle; and
   a fan connected to the housing so as to force airflow through the housing so as to moderate the environment, the fan forcing airflow over at least one of a camera lens and an inside surface of the window to defog the at least one of the camera lens and the inside surface of the window.

2. The system of claim 1, further comprising:
   an electronic control unit to control activation of the fan;
   a temperature sensor; and
   a humidity sensor; wherein each of the temperature sensor and humidity sensor is mounted within the housing and connected to the electronic control unit.

3. The system of claim 2, wherein the electronic control unit receives signals from each of the temperature sensor and the humidity sensor indicating the temperature and humidity within the housing, the electric control unit to apply one or more threshold values to the received signal such that when one of the temperature and humidity value exceeds an associated threshold, the electronic control unit activates the fan to force airflow through the housing.

4. The system of claim 1, wherein the fan is configured to direct the airflow toward a location of the window that is proximate the camera.

5. A method of moderating the environment of a driver assist camera of a vehicle, the method comprising the steps of:
   sensing a temperature within a housing attached to a window of the vehicle and providing a signal indicative thereof;
   comparing the sensed temperature signal to at least one threshold value; and
   activating a fan to force airflow through the housing so as to moderate the environment based on the comparison; and
   forcing airflow over at least one of a camera lens and an inside surface of the window to defog the at least one of the camera lens and the inside surface of the window.

6. The method of claim 5, further comprising the steps of:
   sensing a humidity within the housing and providing a signal indicative thereof;
   comparing the sensed humidity signal to at least one threshold value; and
   activating the fan based on the sensed humidity comparison.

7. The system of claim 1, wherein the fan is configured to direct the airflow toward the camera lens and the inside surface of the window to defog the camera lens and the inside surface of the window.

8. The system of claim 1, wherein the housing includes a port, the fan creating a negative pressure in the housing so that air enters the housing through the port.

9. The method of claim 5, wherein the step of forcing airflow includes forcing airflow toward the camera lens and the inside surface of the window to defog the camera lens and the inside surface of the window.

10. The method of claim 5, wherein the step of forcing airflow includes creating a negative pressure in the housing so that air enters the housing through a port.

* * * * *